No. 616,864. Patented Dec. 27, 1898.
F. H. RICHARDS.
AUTOMATIC WEIGHING MACHINE.
(Application filed Dec. 11, 1897.)
(No Model.) 2 Sheets—Sheet 1.
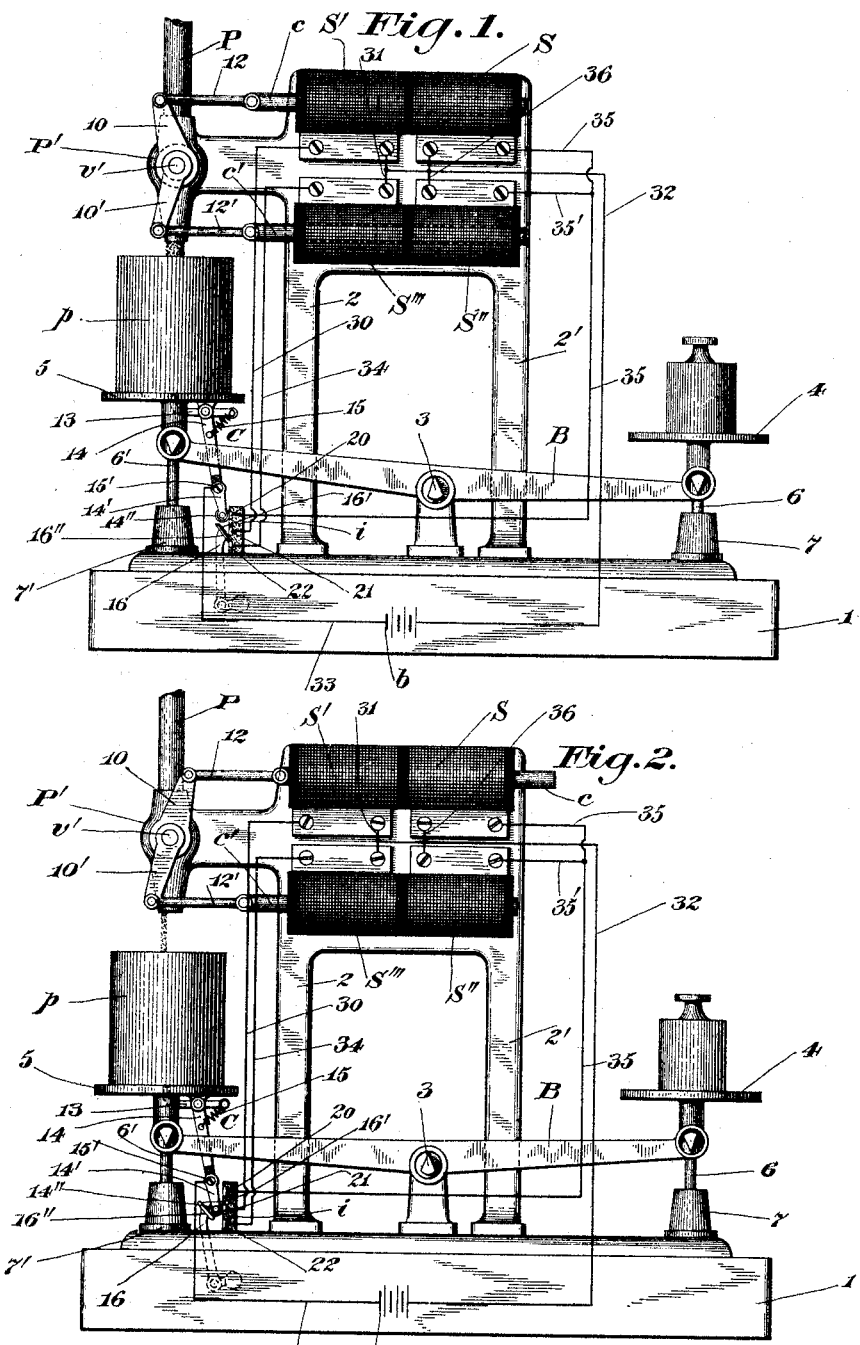
Witnesses:
O. W. Smith
Fred. J. Dole
Inventor:
F. H. Richards.

No. 616,864. Patented Dec. 27, 1898.
F. H. RICHARDS.
AUTOMATIC WEIGHING MACHINE.
(Application filed Dec. 11, 1897.)
(No Model.) 2 Sheets—Sheet 2.
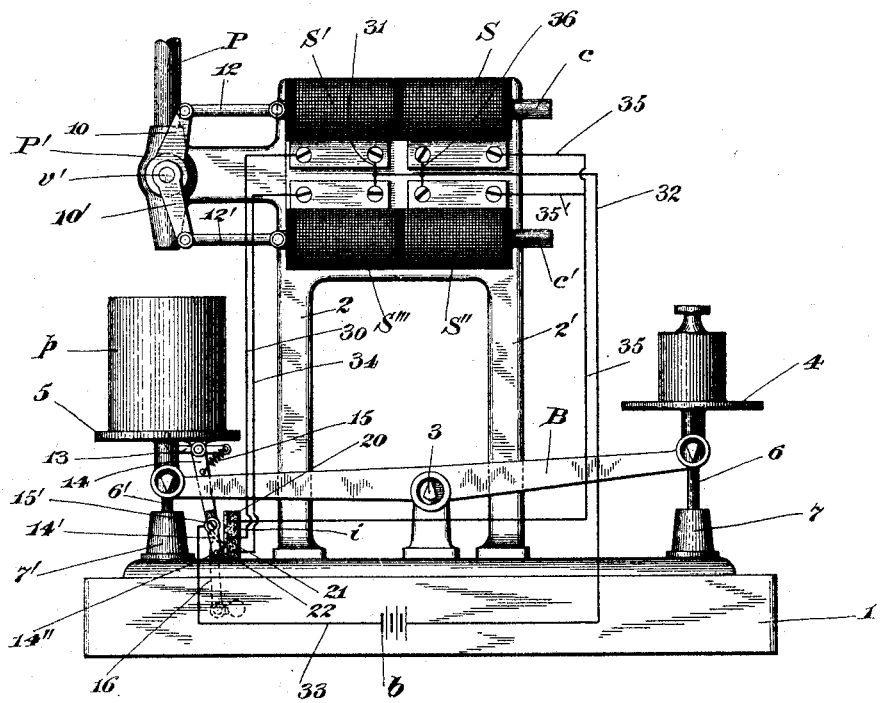
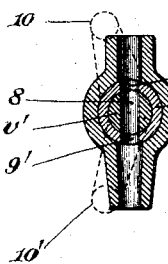 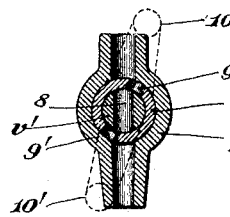 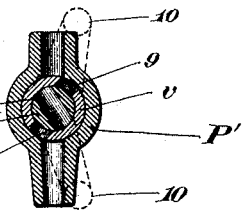
Witnesses:
O. W. Smith
Fred. J. Dole.
Inventor:
F. H. Richards

UNITED STATES PATENT OFFICE.

FRANCIS H. RICHARDS, OF HARTFORD, CONNECTICUT.

AUTOMATIC WEIGHING-MACHINE.

SPECIFICATION forming part of Letters Patent No. 616,864, dated December 27, 1898.

Application filed December 11, 1897. Serial No. 661,527. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Automatic Weighing-Machines, of which the following is a specification.

This invention relates to improvements in weighing-machines adapted for automatically weighing predetermined quantities of material, and particularly to an electrically-controlled weighing-scale in which all of the operations of the valve mechanism are controlled electrically in such a manner that no force will ever be applied to the stream-controlling means for effecting an opening movement thereof during the application of a force for transmitting thereto a closing movement, and vice versa.

The weighing-machine illustrated herein and embodying my present invention is in the nature of an improvement upon that shown and described in my application, Serial No. 661,411, filed December 10, 1897, in which also I have illustrated valve-actuating means of the general type just described. The principal feature of this part of the invention embodying my present improvements as distinguished from the corresponding feature of the invention shown and described in said other application is the employment, in connection with stream-controlling means of valve mechanism, of a pair of actuators which will be operated separately for applying to each valve of the stream-controlling means separate and independent actuating forces and especially successive and independent forces for alternately opening and closing each such valve. I prefer in this case to employ a pair of valves each one of which will be operated directly by electrically-operated actuating means, the preferred construction being one in which a pair of solenoids, one a dextrorsal and the other a sinistrorsal solenoid, have a common core connected directly to the valve, it being obvious, of course, that when a current is passed through the dextrorsal solenoid the core will be drawn thereinto and left in such position and that when the sinistrorsal solenoid is energized the core will be drawn in an opposite direction and left in the position to which it is thus moved. Preferably I employ two pairs of such solenoids, one pair for each valve, and one solenoid of each pair will of course control the opening movement of the valve, while the other will operate the valve and close the same. As it is my intention to employ two valves, one of which will reduce the full stream to a drip-stream at a determined point in the operation of the machine, and hence will constitute a main valve, while the other valve will cut off the drip-stream entirely and will therefore constitute a drip-valve, it will be seen that the main and drip valves will close successively under all circumstances, but that the opening movements thereof may be simultaneous. Hence in the present case I have illustrated electrical controlling devices by means of which the energization of the several solenoids will be so regulated that one solenoid of each pair can never operate at the same time as the corresponding solenoid of the other pair, while the other two solenoids, one for each pair and controlling the opening movements of the respective valves, may always be energized at the same time to open said valve simultaneously. As it will be obvious that in a machine constructed in this manner the operations of the several valves should be dependent entirely upon the proper operation of the weighing mechanism with which they coact, I deem it essential to make use of the movements of the weighing mechanism in its ascent and descent for determining the times at which the valves shall be opened and closed, this feature being one which in a different form is embodied in my other application, hereinbefore referred to in this case. Like the machine shown in said other application, the weighing-scale illustrated herein is especially designed and intended as a mechanism for making up predetermined loads in small charges and particularly for delivering such charges into cans or packages which are removable from the weighing-machine and do not form part of the permanent mechanism of the scale. Owing to this fact and to the further fact that there will not always be a can or package in position under the supply-spout from which the material of the charge is delivered, I prefer to employ, in connection with a suitable carrier or scale-pan on which the package will be supported during the weighing operation, a circuit-controller governed by the positioning of the package, which circuit-controller will maintain all of the valve-controlling circuits open unless there is a package in place under the supply-spout. This circuit-controller may be combined with the circuit-controller governed by the movements of the weighing mechanism proper, and in this case I have illustrated but a single controlling means governed by these two parts. The circuit-controller which I employ for this purpose embodies two members movable relatively to each other, both of these members moving usually with the weighing mechanism during the ascending and descending movements of the latter and one of them being controlled directly by the package-carrier, while the other constitutes the circuit-controller proper, with which suitable contact-terminals on the framework ordinarily will coact. Usually one of these two movable members will be disposed in such a position as to be operated by the package and will be yieldingly connected with the other member by means of a spring, the two parts preferably oscillating about a common axis, and that which makes the circuit directly having a rolling contact device or wheel for reducing friction at the points of contact.

In connection with the weighing mechanism and especially in connection with the device just described I make use of a poising device of improved construction, in which one of a pair of coöperative members travels over the other while moving with the weighing mechanism, one of said members, preferably that supported directly on the framework, having a cam-face for varying the resistance applied by the poising device to the beam mechanism. One member of the poising device will be in this case the rolling contact member of the circuit-controlling means, which rolling member makes contact at one side with a fixed member carrying the contact-terminals governing the circuits to the solenoids, while at the other side thereof said rolling contact member may travel over the cam-face of a counterpoised member supported for oscillation on the framework. The counterpoised member may also constitute a mechanical switchback device for returning the rolling contact device from the last to the first one of a series of three or more contact members without passing over the intermediate contact point or points, the switchback being so positioned as to permit the force applied by the poising device to be taken off from the beam mechanism at the proper point, as well as to switch the rolling contact member away from its normal path of travel on the return of the beam mechanism to the normal position.

In the drawings accompanying and forming part of this specification, Figure 1 is a side elevation of an automatic electrical weighing-machine constructed in accordance with my present improvements and showing the parts in position to deliver a full stream to a can or package on the weighing mechanism. Fig. 2 is a similar view showing the parts in the positions which they assume during the drip period. Fig. 3 is a corresponding view showing the positions of these parts when the supply is cut off entirely. Figs. 4, 5, and 6 are enlarged sectional detail views and illustrate the positions of the valve mechanism during the full-stream, drip, and cut-off periods, respectively.

Similar characters designate like parts in all the figures of the drawings.

Any suitable framework may be employed for supporting the several operative parts of my improved weighing-machine. That illustrated herein embodies as its essential features a base or bed plate 1, from which rise two uprights 2 and 2', connected at their upper ends by a solid frame portion, these parts constituting usually a single or unitary casting.

The weighing mechanism proper embodies as its essential feature beam mechanism preferably of the "single-beam" type, the beam being indicated herein by B. This beam will be supported substantially in the usual manner by knife-edge bearings or pivots, such as 3, on the framework. At the opposite ends of the beam the latter may have pivotally supported thereon by substantially similar knife-edge pivots a pair of flat pans, one of which, 4, constitutes the weight-pan, while the other, 5, is the scale-pan or carrier on which the package is supported during the weighing operation. The two pans 4 and 5 may be guided in their movements in any suitable manner—as, for instance, by depending arms or hanger 6 and 6', working in openings in vertical bosses, such as 7 and 7', rising from the base-plate.

Any suitable stream-controlling means may be employed for the purpose of regulating the flow of material in this improved machine; but I prefer to make use of a simple form of valve mechanism in which the flow of material from an ordinary supply spout or pipe, such as P, will be governed by a pair of plug-valves, (indicated herein by $v$ and $v'$.)

The valve $v'$ is the drip-valve, by means of which the flow of material is cut off when the charge is completed in the can or package on the receiver 5, and this may be supported in the usual valve-body P' at the lower end of the pipe P in the ordinary manner.

The main valve, which is indicated by $v$, is in the form of an annular valve member or shell carried by and journaled on the valve $v'$, and this main valve is intended to operate in this case oppositely to the drip-valve.

The drip-valve has therein the usual opening or passage 8, through which the material will flow when the valves are in their open positions, and the main valve $v$ has a pair of openings 9 and 9' therein adapted to register with such opening in the drip-valve when the parts are in the full-stream position, one of the parts being oscillated in one direction to reduce the full stream to a drip-stream, while the other is oscillated in the opposite direction to cut off the drip-stream and stop the flow.

The opening and closing movements of each valve will be effected by two separate actuators, which will preferably be in the form of solenoids, such as S and S', which are illustrated herein for operating the main valve $v$. Corresponding solenoids S'' and S''' may be employed for actuating the drip-valve $v'$. The solenoids of the first-mentioned set have a common core, which is indicated by $c$, the core of the second set being shown by $c'$. The core $c$ may be connected with the valve $v$ in any suitable manner; but I prefer to make use of a connecting-link 12, pivoted to a rock-arm 10, secured to the stem of the valve $v$, the connection between the core $c'$ and the valve $v'$ being effected in a similar manner by means of a link 12', pivoted to a rock-arm 10'.

It will be understood, of course, that the currents passing through the coils of each pair of solenoids will traverse the coils of the respective solenoids of such pair in opposite directions, the solenoid S serving to draw the core $c$ to the left, as seen in Fig. 1, while the solenoid S', when energized, will pull the core $c$ in the opposite direction or to the right, as seen in Fig. 2. It will be noticed, however, that the solenoids S and S' cannot be energized simultaneously in the construction shown, nor can the solenoids S'' and S''', and hence no valve-closing force will be applied to either valve in opposition to a valve-opening force exerted thereon, and vice versa. The two solenoids S and S'' may, however, be energized simultaneously, as they control the opening of the valves $v$ and $v'$, and it is not necessary or essential that these should open separately.

It will be clear that a single contact-terminal controlled by the beam mechanism may govern the circuits to the solenoids S and S', while a pair of contacts should be used, one for each of the solenoids S'' and S'''. The three contact-terminals which I employ for this purpose are indicated at 20, 21, and 22 and may be contact-points embedded in a block of insulating material, such as $i$, supported on the base 1. These terminals are disposed one above the other in positions corresponding substantially to the counterpoised, poised, and overpoised positions of the beam mechanism.

The contact-terminal 21 is connected by a conductor 30 with one terminal of the solenoid S', from the other terminal of which passes a short conductor 31, which may be connected with the corresponding terminal of the solenoid S'''. From this conductor 31 passes a conductor 32 to one pole of a suitable source of electric energy, such as the battery $b$, the other pole of which is connected, by means of a conductor 33, with the movable circuit-controlling member, hereinbefore referred to, governed by the weighing mechanism and the package-carrier conjointly.

The terminal 22 is connected, by means of a conductor 34, with one terminal of the solenoid S''', the other terminal of which is connected, as just stated, with conductor 31.

The terminal 20, which controls the simultaneous opening of the two valves, is connected, by means of a conductor 35, with one terminal of the solenoid S and by means of a conductor 35' with the corresponding terminal of the solenoid S'', the other terminals of these solenoids being connected with each other by means of a third conductor 36, which in turn may be connected to the conductor 32.

As before stated, both the weighing mechanism proper and the package-carrier 5 are intended to control the circuits to the several valve-actuating solenoids, and the construction of the circuit-controlling means is such that no one of these valve-controlling circuits will be closed unless there is a can or package $p$ in position on the package-carrier. In this case this circuit-controlling means, which is designated in a general way by C, comprises several members, including two main members, one of which is operated by the can or package, while the other is the circuit-controller proper. These two main members are indicated by 13 and 14 and are supported on the package-carrier 5 for oscillation about a common axis. I also provide between these two parts a yielding connection which may be formed by a spring 15, the tension of which is so regulated that it will hold the contact-face of the circuit-controller 14 against the face of the insulating-block $i$ when a can is in place, but will not maintain such contact when there is no can on the package-carrier. One end of the member 13 may be passed through an opening in the pan 5 and normally projects above the upper face thereof. At the lower end of the arm 14 the latter may have a rolling contact-wheel 14'', carried by an adjustable arm 14', which may be held in any desired adjusted position with respect to the arm 14 by means of a set-screw 15' or similar holding member. As the contact-wheel 14'' travels down the face of the insulating-block $i$ and over the contact-points 20, 21, and 22 the turning of the wheel prevents sticking of the contact-surfaces and will lessen the friction at such point, and hence the resistance opposed to the descent of the weighing mechanism. This circuit-controller just described also constitutes part of a poising device by means of which a regulated resistance may be opposed to the descent of the beam mechanism during certain stages in the operation, which resistance may be removed entirely at the proper point in the descent of the beam. The main member of the poising device, however, is in the nature of a counterpoised or counterweighted member, such as 16, which may be supported on the base 1, so as to oscillate thereon when engaged by the wheel 14″. One of the engaging faces, and in this case, of course, a face of the counterweighted member 16, will be cam-shaped, as shown at 16′, and over this cam-face the wheel 14″ will travel between it and the face of the insulating-block i. The parts are so positioned and organized that the wheel 14″ will not come in contact with the cam-face 16′ until the load in the receiver or package p is sufficient to cause the descent of the beam mechanism, and the wheel will ride off from such cam-face at the cut-off point, it being obvious that a graduated resistance to the descent of the beam will be exerted by this poising device. The counterweighted member 16 also constitutes in this case a switchback, which has hereinbefore been mentioned. Said counterweighted lever has not only a cam-face 16′, but also another cam-face 16″ substantially parallel with the first and so positioned that when at the cut-off point the wheel rides off from the face 16′ and the counterweighted member 16 is oscillated to the position shown in Fig. 3 the rolling wheel will ride up over the face 16″ on the ascent of the beam mechanism and will be carried out of its normal path of movement and clear of the contact-terminals on the insulating-block i.

The operation of a weighing-machine constructed in accordance with my present invention, as illustrated in the drawings of this application, is as follows: It being understood that the parts are in the positions shown in Fig. 1, with both valves wide open, as in Fig. 4, and delivering the full stream to the can or package p, all the parts of the weighing mechanism will operate in the usual manner until the beam mechanism is carried down to the point where the rolling contact-wheel 14″ will pass on to the contact-point 21, when the major portion of the charge will have been made up and a circuit completed from the battery through conductor 33, contact-arm 14′, wheel 14″, terminal 21, conductor 30, solenoid S′, conductor 31, and conductor 32, whereupon, of course, said solenoid will be energized and will cause the oscillation of the main valve to the position shown in Figs. 2 and 5, at which time the usual drip-stream will be delivered to the package p for completing the true load. The beam mechanism will continue to descend during the drip period, and the counterweighted poising member or switchback 16 will be oscillated, as shown in Fig. 2, until the rolling wheel 14″ makes contact with the terminal 22 and passes off from the cam-face 16′, whereupon said member will be returned by its counterweight to the position shown in Fig. 3, in which the cam member will abut against the face of the insulating-block i and be stopped against further movement in that direction, and another circuit will be closed, it being in this case from the battery through conductor 33 and contact-arm 14′ to the contact-wheel 14″, from which point the circuit will be through contact 22, conductor 34, solenoid S″″, conductor 31, and conductor 32 back to the battery. The energization of the solenoid S″″ will of course cause the shifting of the valve v′ to the position shown in Fig. 6, when the stream will be entirely cut off. As soon as the filled can is removed from the scale-pan 5 the beam mechanism will rise, and the rolling contact-wheel 14″ will pass over the cam-face 16″ and will not touch the contact-point 21. When the beam mechanism reaches the limit of its return movement, of course the contact-wheel will ride off from the cam-face 16″; but it will not come into contact with the terminal 20 until another empty can is placed on pan 5. Until this is done the contact-arm 14′ and the arm 14, from which it is suspended, will hang freely and will clear the insulating-block and its contact-points. When another can is placed on the pan 5, a circuit will be closed from the battery through the conductor 33, contact-wheel 14′, contact-wheel 14″, contact-terminal 20, and conductors 35 and 35′ to the two solenoids S and S″, the return-circuits being by way of conductors 36 and 32. These two solenoids will be energized simultaneously, and the cores thereof will be shifted to the left, as seen in the drawings, and both valves will be opened simultaneously to make up a new load.

Having described my invention, I claim—

1. In a weighing-machine, the combination, with two independent valves one of which is carried by the other, of two duplex electrically-operated devices controlling the respective operations of said valves, and means for simultaneously energizing one section of each of the duplex electrically-operated devices and for subsequently energizing the other sections thereof.

2. In a weighing-machine, the combination, with weighing mechanism including a load-receiver, of two independent valves; two duplex electrically-operated devices controlling the respective operations of said valves; and means, carried by the load-receiver, for effecting the simultaneous energization of one section of each of the duplex electrically-operated devices and for subsequently effecting the successive energization of the other sections of said devices.

3. In a weighing-machine, the combination, with two independent members, of two duplex electrically-operated devices controlling the respective operations of said members; means, including a movably-mounted circuit-controller, for simultaneously energizing one section of each of the duplex electrically-operated devices and for subsequently energizing the other sections thereof; and means for changing the course of movement of said circuit-controller at a predetermined point.

4. In a weighing-machine, the combination, with weighing mechanism including a load-receiver, of two independent valves, two duplex electrically-operated devices controlling the respective operations of said valves;

means, including a circuit-controller movable with the weighing mechanism, for simultaneously energizing one section of each of the duplex electrically-operated devices and for subsequently energizing the other sections thereof; and means, independent of the weighing mechanism, for changing the course of movement of said circuit-controller at a predetermined point.

5. In a weighing-machine, the combination, with weighing mechanism including a load-receiver, of a supply-pipe; two transversely-bored valves fitted in said pipe and one of said valves being journaled in the other; two duplex electrically-operated devices controlling the respective operations of said valves; and means, governed by the weighing mechanism, for simultaneously energizing each of the duplex electrically-operated devices and for subsequently energizing the other sections thereof in succession.

6. In a weighing-machine, the combination, with a stream-supplying pipe and with a pair of coöperative plug-valves passing through the stream-supplying pipe and one journaled on the other, of a pair of valve-actuators separately operative for applying to said valves successive and independent valve-closing forces.

7. The combination, with weighing mechanism, of valve mechanism; an electrically-operated device for actuating the valve mechanism; means for effecting the energization of said electrically-operated device, said means including a movably-mounted circuit-controller; and means for changing the course of movement of said circuit-controller.

8. The combination, with weighing mechanism, of two valves, two duplex electrically-operated devices controlling the respective operations of the valves, a series of contact-points on the framework connected with said duplex electrically-operated devices; a circuit-controller carried by the weighing mechanism and adapted to coöperate with said contact-points, and means for changing the course of the movement of said circuit-controller.

9. In a weighing-machine, the combination, with stream-supplying means and with a stream-controlling valve, of weighing mechanism embodying beam mechanism and a package-carrier; a circuit-controller governed by the placing of a package in position on the package-carrier and having a pair of members movable relatively to each other; and an electric circuit controlling the operation of a movable member of the weighing-machine.

10. In a weighing-machine, the combination, with stream-supplying means and with a stream-controlling valve, of weighing mechanism embodying beam mechanism and a package-carrier; a circuit-controller governed by the placing of a package in position on the package-carrier and having a pair of yieldingly-connected members movable relatively to each other; and an electric circuit controlling the operation of a movable member of the weighing-machine.

11. In a weighing-machine, the combination, with stream-supplying means and with a stream-controlling valve, of weighing mechanism embodying beam mechanism and a package-carrier; a circuit-controller governed by the placing of a package in position on the package-carrier and having a pair of members movable relatively to each other, one controlled by the package and the other controlling the circuit; and an electric circuit controlling the operation of a movable member of the weighing-machine.

12. In a weighing-machine, the combination, with stream-supplying means and with a stream-controlling valve, of weighing mechanism embodying beam mechanism and a package-carrier; a circuit-controller governed by the placing of a package in position on the package-carrier and having a pair of oscillatory members movable relatively to each other; and an electric circuit controlling the operation of a movable member of the weighing-machine.

13. In a weighing-machine, the combination, with stream-supplying means and with a stream-controlling valve, of weighing mechanism embodying beam mechanism and a package-carrier; a circuit-controller governed by the placing of a package in position on the package-carrier, and having a pair of oscillatory members movable relatively to each other about a common axis; and an electric circuit controlling the operation of a movable member of the weighing-machine.

14. In a weighing-machine, the combination, with stream-supplying means and with a stream-controlling valve, of weighing mechanism embodying beam mechanism and a package-carrier; a circuit-controller governed by the placing of a package in position on the package-carrier and having a pair of members movable relatively to each other and a rolling contact device on one of said members; and an electric circuit controlling the operation of a movable member of the weighing-machine.

15. In a weighing-machine, the combination, with stream-supplying means and with a stream-controlling valve, of weighing mechanism, and a poising device embodying a pair of coöperative members, one movable with the weighing mechanism and adapted to travel over the other, and one having a cam-face for varying the resistance opposed to the movement of the traveling member.

16. In a weighing-machine, the combination, with stream-supplying means and with a stream-controlling valve, of weighing mechanism, and a poising device embodying a member movable with the weighing mechanism and adapted to travel over the face of the other, and a counterpoised member coöperative therewith, one of said members having a cam-face for varying the resistance opposed to the movement of the traveling member, 17. In a weighing-machine, the combination, with stream-supplying means and with a stream-controlling valve, of weighing mechanism; an electric circuit governing the operation of a movable member of the weighing-machine; a contact-terminal in said circuit; a circuit-controller governed by the weighing mechanism and shiftable onto said contact-terminal during one movement of the weighing mechanism; and a switchback for shifting said circuit-controller out of its normal path of travel during another movement of the weighing mechanism.

18. In a weighing-machine, the combination, with stream-supplying means and with valve mechanism, of weighing mechanism; a plurality of electric circuits controlling the movements of the valve mechanism; a series of contact-terminals, one for each circuit; a circuit-controller governed by the weighing mechanism and shiftable onto said contact-terminals successively during the descent of the weighing mechanism; and a counterpoised switchback for shifting said circuit-controller out of its normal path of travel during the ascent of the weighing mechanism.

FRANCIS H. RICHARDS.

Witnesses:
F. N. CHASE,
JOHN O. SEIFERT.